(No Model.) 4 Sheets—Sheet 1.
D. N. HURLBUT.
MEANS FOR DRIVING ELECTRICAL CONDUCTORS INTO CONDUITS.
No. 321,363. Patented June 30, 1885.
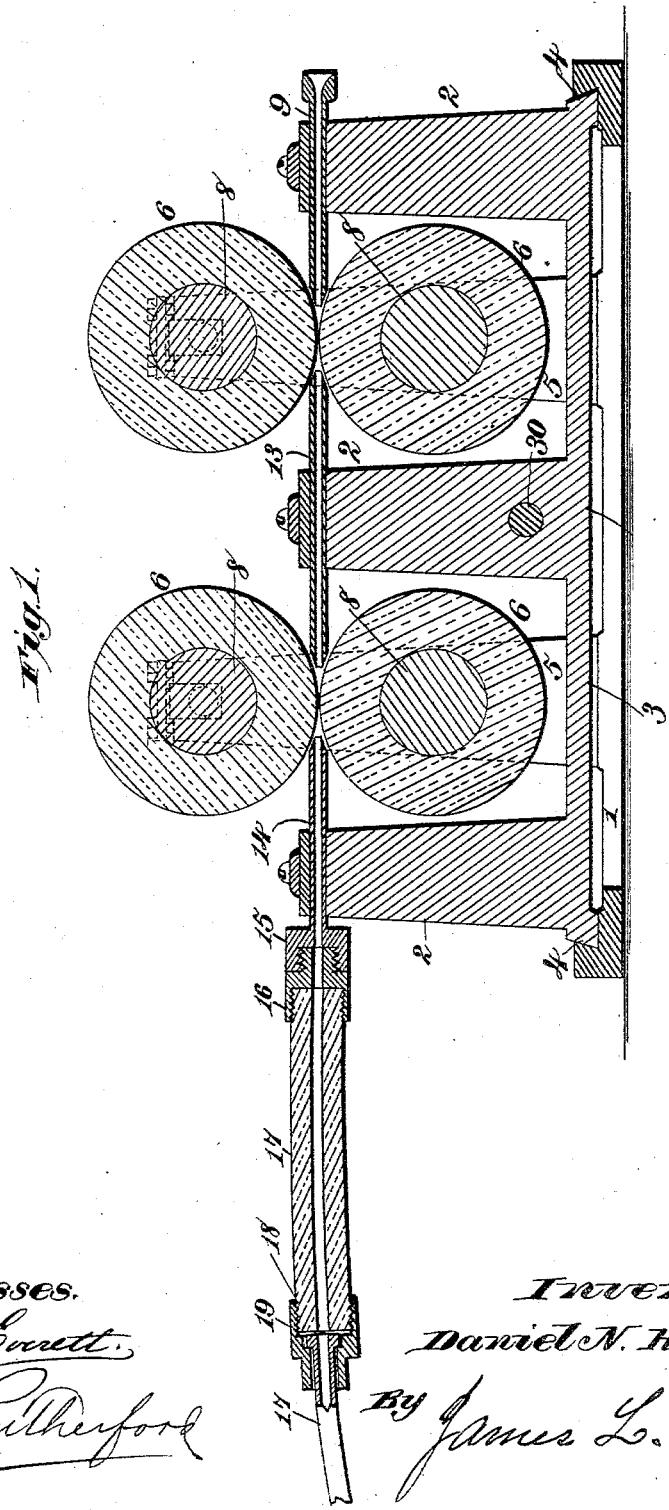

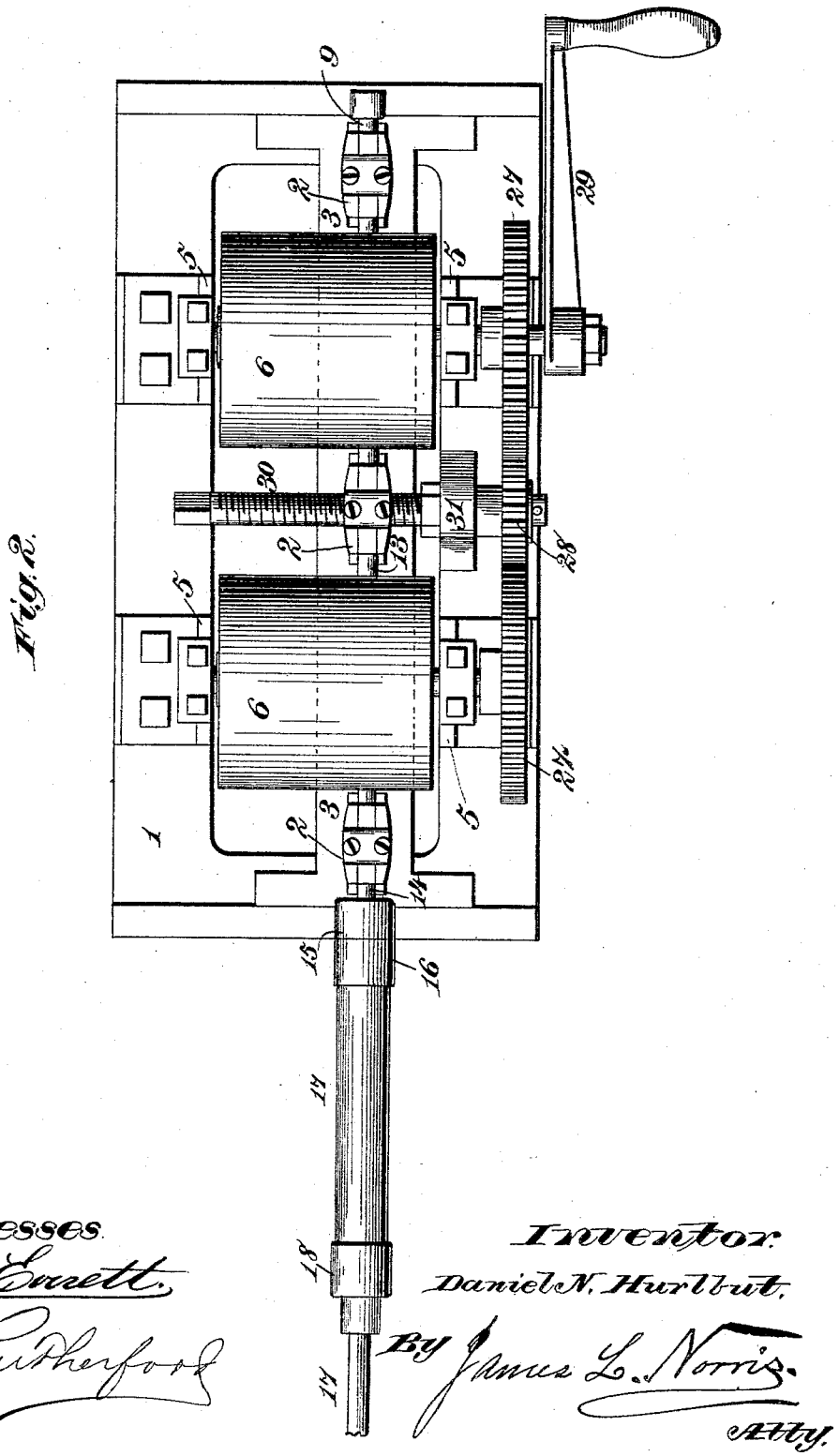

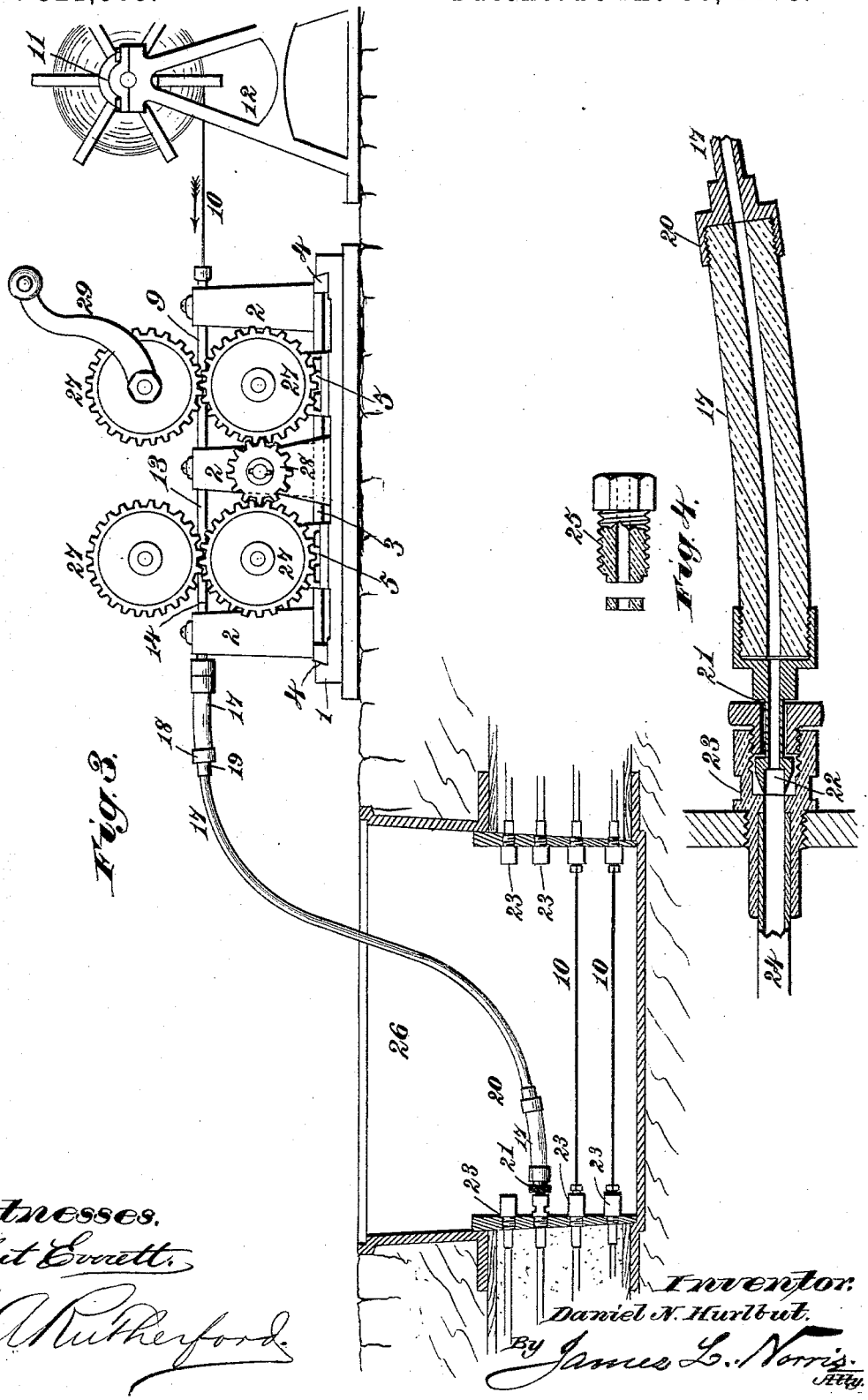

(No Model.) 4 Sheets—Sheet 4.
D. N. HURLBUT.
MEANS FOR DRIVING ELECTRICAL CONDUCTORS INTO CONDUITS.
No. 321,363. Patented June 30, 1885.
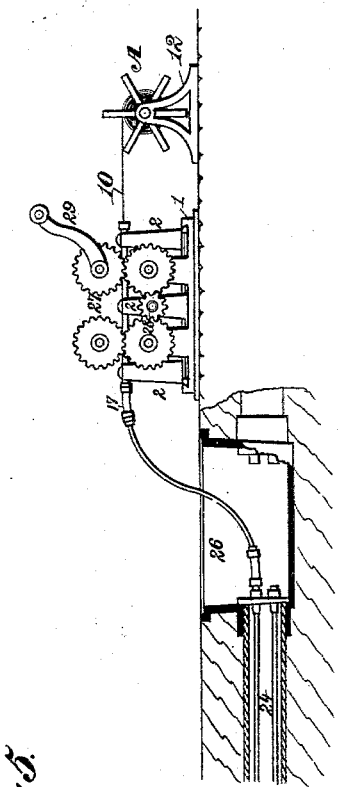
Fig. 5.
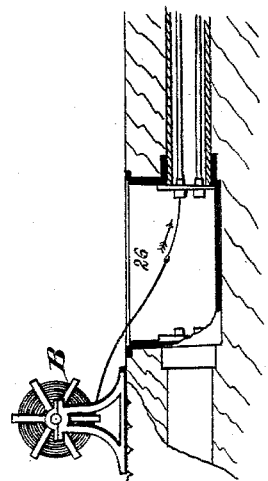
Witnesses.
Robert Everett,
Chas. F. Pfzer
Inventor:
Daniel N. Hurlbut.
By James L. Norris.
Atty.

UNITED STATES PATENT OFFICE.

DANIEL N. HURLBUT, OF CHICAGO, ILLINOIS.

MEANS FOR DRIVING ELECTRICAL CONDUCTORS INTO CONDUITS.

SPECIFICATION forming part of Letters Patent No. 321,363, dated June 30, 1885.

Application filed April 10, 1884. (No model.)

*To all whom it may concern:*

Be it known that I, DANIEL N. HURLBUT, a citizen of the United States, residing at Chicago, in the county of Cook and State of Illinois, have invented new and useful Improvements in Means for Driving Electrical Conductors into Conduits, of which the following is a specification.

This invention has for its object to provide means for introducing electrical conductors into underground conduits or pipes; and the invention consists, among other things, in the combination of a needle-wire, guides for guiding said wire into the end of a conduit or pipe, and rotating pressure-rollers for driving or forcing such needle-wire through the conduit or pipe and then retracting it when connected to the electrical conductor to be introduced.

The invention also consists of other features, which will be hereinafter described and claimed.

In the accompanying drawings, Figure 1 is a longitudinal central sectional view of an apparatus embodying my invention; Fig. 2, a top plan view; Fig. 3, a side elevation showing the position of all the parts when in use, and Fig. 4 sectional detail views. Fig. 5 is a side view of the apparatus, illustrating the pressure-rollers, the guide and conductor-guide, the reel for feeding the needle-wire, and the reel for paying out the electrical conductor.

Referring to the said drawings, the number 1 indicates a supporting-base on which are arranged three standards or posts, 2, connected at their base by a plate, 3, the ends of which are arranged in grooves 4 at the ends of the base. The supporting-base at each side is provided with two uprights, 5, each opposite pair of which is provided with suitable boxes or bearings for the journals of two rollers, 6, arranged, respectively, one above the other, joined to the shafts 8. One of the end posts 2 carries a horizontal tubular guide, 9, preferably having a flaring mouth for receiving the end of a needle-wire, 10, which may be wound or coiled on a reel, A, supported by a frame, 12, at or near one end of the machine, while the central post 2 carries another tubular guide, 13, which receives the needle-wire as it emerges from the first pair of rollers and guides it to the second pair, and the other end post carries a guideway, 14, provided at its outer end with an attached screw-nut, 15, into which is screwed the threaded shank on a coupling, 16, having a threaded socket, into which one end of the flexible or tubular extremity of the conductor-guide 17 is secured, the other end of the flexible section or extremity being provided with an attached socket-coupling, 18, in which one end of the conductor-guide is swiveled, as at 19, the other end of the conductor-guide having a socket-coupling, 20, in which is secured one end of the other flexible or tubular rubber extremity of the conductor-guide, carrying at its other end a coupling having a tubular shank, 21, provided with a nipple, 22, adapted to enter the outer end of the terminal 23 of a conduit, 24, as in Fig. 4. The shank 21 is provided with a loose screw-nut, the object of which is to screw into the open end of the terminal after removing therefrom the screw-plug 25, whereby the outer end of the conductor-guide is connected with the conduit or tube 24 for the purpose of directing and guiding the needle-wire 10 and the electrical conductor 11 into the conduit or pipe when said needle-wire is advanced by the pressure of the rollers acting to drive or impel it along.

As here illustrated, the needle-wire is introduced to the conduits at a man-hole, 26, and the terminals are of the construction for which I have heretofore obtained Letters Patent; but any other suitable construction may be used, if desired. The machine being located on the surface of the ground, the rigid part of the conductor-guide between the flexible extremities is bent downward, and the said guide being swiveled at its upper or inner end, as at 19, can be freely turned for the purpose of connecting the other end with the terminal of any one of a series of conduits or pipes, while the flexible extremities prevent binding or twisting of the connections in adjusting or moving the outer end of the guide to any of the terminals.

The conduits or pipes shown are of any usual desired form and material, but may simply be paper tubes laid in a body of asphalt buried in the ground; but obviously the construction of the conduits or pipes and terminals constitutes no part of the present invention.

The shafts of each pair of pressure rollers are provided, respectively, with a gear-wheel, 27, meshing together, and the lower gear-wheels of the respective pairs mesh with a pinion, 28, by which motion is transmitted from the first pair of rollers, power being applied through the medium of a crank, 29, or any other suitable means.

In the drawings I have shown an adjusting-screw provided with a screw-thread, working in a threaded orifice or nut in the central post, 2, in such manner that the three posts carrying the tubular guides and the guideway can be adjusted or moved transversely to the base of the frame, thereby presenting the needle-wire to different parts of the surfaces of the rollers, whereby the same parts of the roller-surfaces will not continuously act on the needle-wire or conductor as the same may be advanced, thus preventing undue wearing of or injury to the surfaces of the rollers. Still this adjustment need not be employed.

The ends of the tubular guides and the guideway which are adjacent to the rollers are beveled for the purpose of bringing them between the rollers, and as near as practicable to a vertical line taken centrally through the rollers, thereby preventing the needle-wire from being kinked or bent by the action of the rollers in impelling the same.

The parts being in the position shown in Fig. 3, the needle-wire will be accurately guided and held between the rollers as the latter advances it, and the conductor-guide directs and guides the needle-wire from the guideway into the terminal or end of the conduit or pipe, through which it is driven by the pressure and rotation of the rollers, which rollers may be of any suitable material—such as brass, iron, or hard wood. The end of the needle-wire, before entering the conduit or pipe at the end of the conducting-tube, is preferably bent upon itself or a bulbous projection formed or attached to the end, so that such end will smoothly glide past all joints or projections that may be present either in the guides, the terminals, or the conduits.

The means for rotating the rollers may be variously changed or modified, and a single pair of rollers may be used and variously changed or modified; but I prefer to employ two or more pairs for acting on the needle-wire, thus impelling the same with a greater forward force.

The needle-wire is wound or coiled upon the reel A and then paid out to the pressure-rollers for introduction into and through the conduit or pipe, as hereinbefore set forth. I prefer, and it will be found most advantageous and eminently practical, to connect the electrical conductor or cable with the free end of the needle wire or rod 10 by a hook, clip, or clamp, or otherwise, at the exit of the conduit or pipe, the needle-wire having been propelled through the conduit or pipe for such purpose, as illustrated in Fig. 5 of the drawings, when it is retracted or drawn back through the conduit or pipe, carrying with it the electrical conductor or cable, which is paid out by and from the reel B, which retraction or withdrawal of the needle-wire can be accomplished by rewinding on the reel A, which will be found sufficient to retract or withdraw the needle wire or rod along with the electrical conductor or cable connected therewith. Still the pair or duplicate pair of rollers, which are employed for driving or forcing through the conduit or pipe the needle-wire, may be employed for retracting or withdrawing the same back through the conduit or pipe, carrying along with it the electrical conductor or cable, or said pair or duplicate pair of rollers may be employed in connection with the reel, in which case less power would be required to rotate the reel, as the rollers would act as the medium of withdrawing the needle-wire and conductor or cable connected therewith.

The coiled needle-wire can, in the manner described, be rapidly and with facility driven into and through a conduit or pipe for a considerable length. The entire mechanism is, comparatively speaking, simple in construction and in its mode of operation, and but little labor is involved in the working of the method.

I am aware that electric conducting-wires have been pushed through conduits or tubes by means of rotating pressure-rollers and means for directing the wires into such conduits. In such system of laying wires the wire is fed forward by a machine located at the starting place or man-hole leading to the conduit, and is connected with a similar machine arranged at the next succeeding man-hole, such two machines now working simultaneously to feed the wire to a third man-hole, when the wire is connected with still another machine, and so on along the entire route.

My invention differs essentially from the above, since I make use of a so-called "needle-wire," which serves as a carrying medium for the electric conducting-wire, and is operated in such a manner that after it has been forced or pushed through a conduit from one man-hole or station to another it is connected with the conducting-wire and made to retrace its course from the second station to the first station, so as to lay the conducting-wire in a simple, expeditious, and perfect manner. By providing a needle or carrier wire which operates in the manner herein set forth, I am enabled to lay conducting-wires into long conduits with a single machine, consisting, essentially, of two rotating pressure-rollers, and means for directing the needle-wire into the conduit.

It is obvious that by pushing electric conducting-wires through conduits by direct-acting machines or rollers acting directly upon said wires, powerful pressure and large machines are required to feed the wire through the conduit, whereas in my invention I can use a needle or carrier wire which can be made of some strong and hard metal of a comparatively small diameter, so that smaller machines and a less expenditure of force are required to first force or push the conduit and then retract it by the same machine, together with the electric conducting-wire connected with it.

Having thus described my invention, what I claim is—

1. In an apparatus for introducing electric conductors within conduits or pipes, the combination of a needle or carrier wire and mechanism, substantially as shown, for forcing said needle or carrier wire through a conduit or pipe and pulling it backward with the electric conducting-wire attached thereto through the conduit through which it has been pushed, substantially as described.

2. In an apparatus for introducing electric conductors within conduits, the combination of a needle or carrier wire, with rotating pressure-rollers, a guideway for receiving the needle-wire from the rollers, and a tubular conducting-guide connecting with one end of the guideway, and adapted to be connected with a conduit or pipe, substantially as described.

3. The combination, with a needle-wire and rotating pressure-rollers for advancing said needle-wire, of a conductor-guide for receiving the needle-wire from the rollers, and a coupling at one end of the conductor-guide for connecting the conductor-guide with a conduit for directing the needle-wire into the conduit or pipe through which it is driven by the pressure-rollers, substantially as described.

4. The combination, with a needle-wire and rotating pressure-rollers for advancing said needle-wire, of a guide at one side of the rollers for guiding the wire or conductor thereto, a guideway at the other side of the rollers for receiving the advancing wire or conductor therefrom, and a conductor-guide connected with said guideway, and having means to connect it with one end of a conduit or pipe for directing and guiding the needle-wire into the conduit or pipe, through which it is driven by the rollers, substantially as described.

5. The combination, with a needle-wire and rotating pressure-rollers, of a guideway for receiving the advancing needle-wire from the rollers, and a conductor-guide connected at one end with the guideway, and provided at the other end with an attached coupling for connecting it with a conduit or pipe, substantially as described.

6. The combination, with a needle-wire and rotating pressure-rollers for advancing said needle-wire, of a guide for delivering the same to the rollers, a guideway for receiving the needle-wire from the rollers, and a tubular conductor-guide connecting with one end of the guideway, and adapted to be connected with a conduit or pipe, substantially as described.

7. The combination, with a needle-wire and pressure-rollers for advancing said needle-wire, of an adjustable conductor-guide for receiving the same and directing it into any one of a series of conduits or pipes, through which said needle-wire is driven by the pressure-rollers, substantially as described.

8. The combination, with pressure-rollers, of an adjustable conductor-guide having means to connect it with the end of any one of a series of conduits or pipes, substantially as described.

9. The combination, with a needle-wire and pressure-rollers for advancing said needle-wire, of a guideway for receiving the same from the rollers, and an adjustable conductor-guide connected at one end with the guideway, and having means at its other end for connecting it with any one of a series of conduits or pipes, substantially as described.

10. The combination, with a needle-wire, and pressure-rollers for advancing said needle-wire, of a conductor-guide having flexible extremities, and acting to direct the advancing needle-wire into a conduit or pipe, substantially as described.

11. The combination, with a needle-wire and pressure-rollers for advancing said needle-wire, of guides for the same located between the rollers, and a jointed adjustable conductor-guide for directing the advancing needle-wire to any one of a series of conduits or pipes, substantially as described.

In testimony whereof I have affixed my signature in presence of two witnesses.

D. N. HURLBUT.

Witnesses:
 JAMES L. NORRIS,
 J. A. RUTHERFORD.